United States Patent [19]
Barbieri

[11] 4,050,807
[45] Sept. 27, 1977

[54] PROCESS AND DEVICE FOR COPYING PHOTOGRAPHIC COLOR IMAGES

[75] Inventor: Siegfried Barbieri, Brixen, Italy

[73] Assignee: Durst AG. Fabrik Fototechnischer Apparate Bozen, Bolzano-Bozen, Italy

[21] Appl. No.: 657,075

[22] Filed: Feb. 11, 1976

[30] Foreign Application Priority Data

Mar. 6, 1975 Italy .................................. 4812/75

[51] Int. Cl.² ...................... G03B 27/32; G03B 27/52
[52] U.S. Cl. .......................................... 355/32; 96/11; 350/315; 350/316; 355/71; 355/77
[58] Field of Search .................. 355/32, 71, 77, 88; 350/315, 316; 96/11

[56] References Cited
U.S. PATENT DOCUMENTS

| 3,324,764 | 6/1967 | Altman | 355/32 X |
| 3,754,823 | 8/1973 | Weisglass et al. | 355/71 X |
| 3,829,210 | 8/1974 | Langer et al. | 355/71 X |

Primary Examiner—Richard A. Wintercorn
Attorney, Agent, or Firm—Connolly and Hutz

[57] ABSTRACT

A blocking filter is used, in conjunction with the substractive filter method of copying photographic color images, to remove or substantially remove by greatly weakening wave lengths from the copying light in the range in which the filter characteristics of the blue and green color filters or the spectral sensitivity curves of photographic copying paper overlap each other, or more particularly in a 30 nm belt about a central wave length of approximately 500 nm.

12 Claims, 2 Drawing Figures

PROCESS AND DEVICE FOR COPYING PHOTOGRAPHIC COLOR IMAGES

BACKGROUND OF THE INVENTION

The invention relates to a process and a device for copying or enlarging photographic color images in accordance with the subtractive method. In the copying of photographic color images in accordance with the subtractive method, filtering devices are often inserted which help influence the color composition of the copying light in that three color filters, adapted to the individual sensitivity ranges of the copying paper, may be inserted into a beam of light emanating from a white-emitting light source. The filters inhibit the beam portion corresponding to their particular blocking area, depending on the depth of their insertion into the light beam. The better the sensitivity range of the individual color layers corresponds with the particular color filter, the greater the blocking action achieved for the copying paper. However, since individual sensitivity ranges of the copying paper overlap, the blocking ranges of the corresponding color filters must also overlap each other if the greatest possible filter densities are to be achieved for the individual sensitivity ranges. This results in that with a change of the insertion depth of the color filters into the beam of light, not only the illumination of the desired sensitivity range but also of the adjacent one is influenced to a certain extent. The degree of this two-way influence depends on the expansion of the overlapping areas and on the adaptation of the color filters to the particular sensitivity range. This two-way influence makes the determination of the correct color balance more difficult and has a disturbing effect on any subtractive copying method, be it that the correct color balance is produced by repeated copying attempts or determined by measurements before or during the copying procedure.

In the previously known filter devices, the filters pertaining to the overlapping sensitivity ranges of the copying paper are usually arranged in such a manner that blocking edges adjacent thereto proceed through the point of intersection of the spectrum-sensitivity curves defining the adjacent sensitivity ranges.

By this step, a compromise is reached between the limitation of the disruptive, reciprocal influence on the one hand and the achievable filter density in the basic colors corresponding to the individual sensitivity ranges on the other hand.

The disruptive effect by the reciprocal influence of sensitivity ranges, adjacent to each other, may be produced in such a manner that the individual color filters, aside from their main density in their basic colors, also have a secondary density in the adjacent basic color, the degree of this secondary density depending on the course of the blocking edge of the color filter facing the adjacent basic color. These secondary densities may be decreased in that the course of the blocking edges of the particular color filters is determined in such a manner that their blocking range only coincides with a small part of the overlapping area of the sensitivity ranges. In such a case, however, an undesirable decrease of the achievable main density in the respective basic colors must be taken into consideration.

In the known filter devices, wherein color filters may be inserted into a beam of light emanating from a white-emitting light source, each movement of the blocking edges proceeding through the overlapping range is expressed as a change of the blocking action of the corresponding color filters, inconsistantcies therein being caused by temperature changes, for instance. This causes the drawback in such filter devices that a once-adjusted proportion of the basic color portions of the copying light is not stable and thus brings about changes in copying results which are difficult to control.

In mass production of such known filter arrangements, color filters with a very narrow toleration blocking edge course must be employed, since the inconsistancies caused by copy straying otherwise effect intolerable quality differences in the end product. Maintaining such narrow tolerance limits also disadvantageously affects production costs of the product.

A further drawback of the known filter arrangements consists of the blocking characteristic of the filters employed in many instances not proceeding sufficiently steeply and thus cannot be adjusted precisely enough to the sensitivity curve of the corresponding sensitivity range of the copying paper, something which limits the achievable filter density.

The object of the invention is to provide a method and a device for the copying of photographic color images in accordance with the subtractive method, wherein a filtering, independent of the adjacent basic colors, is possible and wherein the drawbacks, caused by the blocking characteristic of color filters or by their changes or straying, do not occur.

SUMMARY

This object is solved by a process of the previously stated type in that the copying light penetrating the image copy contains in the wave length range no light portions or greatly weakened light portions as compared to those in other wave-length areas. The wave-length range coincides with a transitional range of the sensitivity areas of the copying paper. Advantageous devices for the carrying out of the described process are later described.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENT

Figure 1:
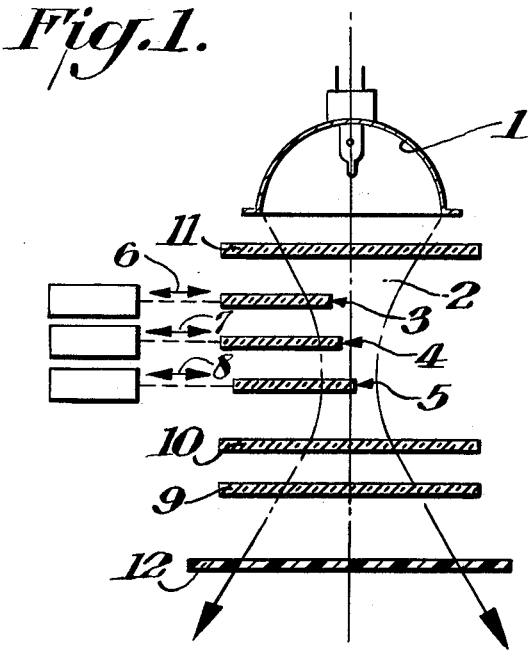
FIG. 1 is a schematic illustration of a filter device for a copying apparatus according to the invention.

Into a light beam 2, radiated from a white-emitting light source 1, there are insertable in a known manner color filters 3, 4, 5 in the direction of arrows 6, 7, 8. The blocking characteristic of each of the color filters 3, 4, 5 is adapted to a different one of the three sensitivity areas of the copying paper. The deeper each filter is inserted into the light beam 2, the stronger it represses the beam portion corresponding to the particular blocking range. Provided below the color filters 3, 4, 5 is a light filter 9 which occupies the entire light beam 2 and suppresses the copying light in the wave-length range, which coincides with the overlapping range of the sensitivity area of the copying paper.

Figure 2:
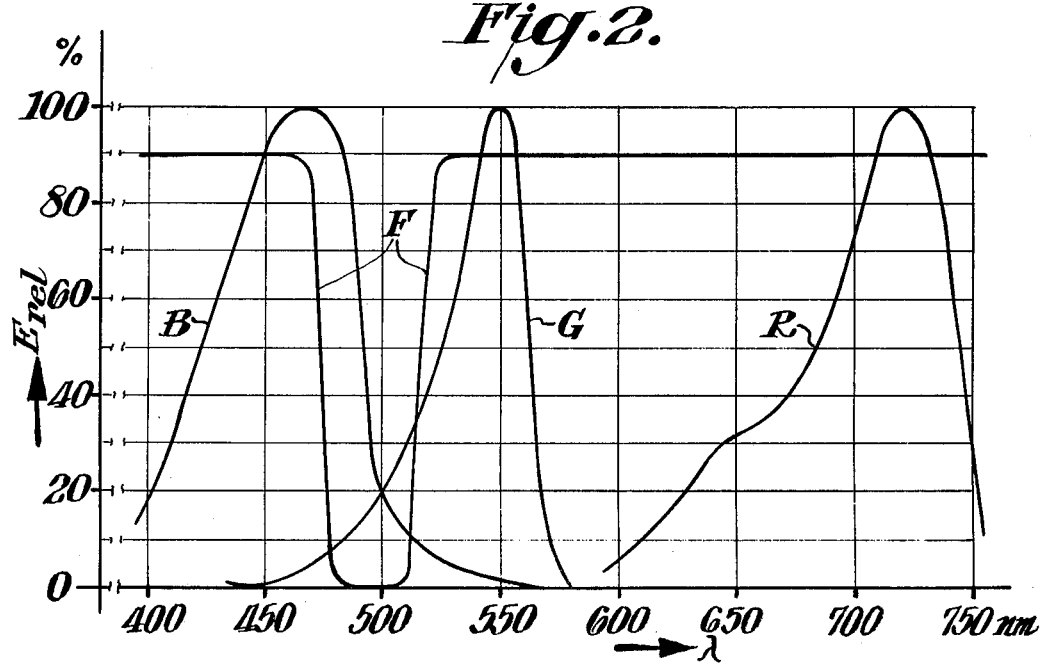
FIG. 2 is a diagram illustrating the relative spectral sensitivity of the copying paper and the characteristics of a novel filter of the invention.

FIG. 2 shows the spectral sensitivity curves for the blue, green, or red-sensitive areas of the copying paper, indicated with B, G or R. The ordinate of the diagram refers to the relative spectral sensitivity of the copying paper $E_{rel}$, and on the abscissa the wave lengths $\lambda$ in the area of the visible spectrum are noted.

In the wave-length range at 500 nm, the blue and green-sensitive areas overlap.

Light filter 9, for example, has a blocking characteristic whose course is designated by F in the diagram. As shown by this characteristic, light filter 9 suppresses the light portions contained in the light beam 2, whose wave-lengths are situated in a belt of 30 nm about the central wave length of 500 nm. This central wave length corresponds to the point of intersection of the spectral sensitivity curves B and G. This course of the spectral characteristic of light filter 9 assures that the light in the overlapping area is weakened to such an extent that a reciprocal influencing possibility of the two color filters 3 and 4 pertaining to the two sensitivity areas defined by curves B and G is completely out of the question.

The blocking range of light filter 9, as shown by the diagram, partially coincides with the adjacent blocking edges of filters 3 and 4. It follows that a displacement of these blocking edges due to temperature changes or inconsistency in material has no effect on the adjusted color balance or on the achievable filter density in the respective filter colors.

In addition, by the use of light filter 9, any secondary densities, resulting due to insufficient adaptation of filters 3 and 4 to the spectral sensitivity curves of the copying paper, become ineffective.

Also achieved by means of the blocking characteristic F of filter 9 is a basic filtering in the blue range, whereby the high color temperature when using a quartz-halogen lamp as the light source 1 is adjusted to the color temperature of 2400° K, which is necessary for the commercial copying paper. By means of such a basic filtering, the normal position of the corresponding color filters in the light beam 2 is reduced and the regulating area for the filtering increased. The degree of the basic filtering may be increased in comparison to the situation presented if the blocking characteristic F of light filter 9 occupies a still greater portion of the blue-sensitive area of the copying paper.

Situated above filter 9 are an ultraviolet filter 10 and an infrared filter 11. Light filter 9 may be combined in an advantageous manner with the two later-mentioned filters. The position of the individual filters 9, 10, 11 is arbitrarily shown in the drawing and is immaterial relative to the invention. It may be changed at will without thereby changing the composition of the copying light passing through the copy 12.

Light filter 9 with the blocking characteristic F may also be used advantageously in copying or enlarging devices, wherein the color filters 3, 4, 5, upon an initial white illumination, in sequence are completely inserted into the light beam 2 on reaching a predetermined degree of color saturation in the particular primary color, since in this instance also the secondary densities caused by the overlapping of the sensitivity areas lose their disruptive effect.

In the device described, the light portions of a white-emitting light source coinciding with the overlapping area of the sensitivity range of the copying paper, are suppressed by light filter 9 with the respective blocking characteristic. The same effect may be achieved in that a copying light source is placed into the device, which in the wave-length range coinciding with the blocking area of light filter 9 radiates no light or whose radiation in such wave-length range is greatly reduced as compared to the light portions in other wave-length ranges.

The illustration of the filter device in FIG. 1 is highly schematic and serves exclusively for an explanation of the function of light filter 9. For a satisfactory operation of the copying or enlarging devices described, there are provided between light filter 9 and image copy 12, to be copied in a known manner, light-mixing means whose assignment consists of homogenizing the copying light in its color composition.

I claim:

1. A process for copying or enlarging of photographic images in accordance with the substractive method in which substractive color filters are selectively interposed at variable depths in the path of the printing light, the process being characterized by substantially removing wave lengths from the copying light in the overlapping wave length range of the spectral sensitivity curves of photographic copying paper whereby disruptions caused by the reciprocal effect of filters in the overlapping wave lenths is minimized.

2. A process as set forth in claim 1 wherein the wave lengths are removed by fully inserting a blocking filter in the path of a copying light which removes the overlapping wave lengths.

3. A process as set forth in claim 1 wherein the wave lengths which are removed are in the overlapping range between blue-and green-sensitive areas of photographic copying paper.

4. A process as set forth in claim 3 wherein the wave lengths which are removed are in a range about 30 nm wide about a central wave length of approximately 500 nm.

5. A process as set forth in claim 1 wherein other undesired ranges of wave lengths are also substantially removed from the copying light.

6. A process as set forth in claim 1 wherein the overlapping wave lengths are substantially completely removed from the copying light.

7. A device for filtering undesirable wave lengths from light used for copying photographic color images by the substractive method in which substractive color filter are selectively interposed at variable depths in the path of the printing light, comprising filter means, and the filter means being characterized by substantially filtering out wave lengths corresponding to the overlapping wave lengths of the spectral sensitivity curves of photographic copying paper.

8. A device as set forth in claim 7 wherein the filter means filters out wave lengths in the overlapping wave length-removing range of blue-and green-sensitive areas of photographic copying paper.

9. A device as set forth in claim 8 wherein the filter means is constructed and arranged to remove wave lengths in a range which is about 30 nm wide about a central wave length of approximately 500 nm.

10. A device as set forth in claim 7 wherein the filter means is combined with a basic filter.

11. A device as set forth in claim 7 wherein the filter means is combined with a infrared filter.

12. A device as set forth in claim 7 wherein the filter means is combined with an ulraviolet filter.

* * * * *